(12) United States Patent
Choi et al.

(10) Patent No.: US 11,552,376 B2
(45) Date of Patent: Jan. 10, 2023

(54) ELECTRODE ASSEMBLY AND METHOD FOR MANUFACTURING THE SAME

(71) Applicant: LG Chem, Ltd., Seoul (KR)

(72) Inventors: Soon Hyung Choi, Daejeon (KR); Su Rim Lee, Daejeon (KR); Seok Koo Kim, Daejeon (KR)

(73) Assignee: LG Energy Solution, Ltd.

( * ) Notice: Subject to any disclaimer, the term of this patent is extended or adjusted under 35 U.S.C. 154(b) by 253 days.

(21) Appl. No.: 16/646,273

(22) PCT Filed: Jul. 11, 2019

(86) PCT No.: PCT/KR2019/008590
§ 371 (c)(1),
(2) Date: Mar. 11, 2020

(87) PCT Pub. No.: WO2020/036318
PCT Pub. Date: Feb. 20, 2020

(65) Prior Publication Data
US 2020/0287196 A1 Sep. 10, 2020

(30) Foreign Application Priority Data
Aug. 13, 2018 (KR) .................. 10-2018-0094484

(51) Int. Cl.
*H01M 50/54* (2021.01)
*H01M 10/0585* (2010.01)
(Continued)

(52) U.S. Cl.
CPC ....... *H01M 50/54* (2021.01); *H01M 10/0585* (2013.01); *H01M 50/531* (2021.01);
(Continued)

(58) Field of Classification Search
CPC ..................... H01M 50/54; H01M 50/548
See application file for complete search history.

(56) References Cited

U.S. PATENT DOCUMENTS

| | | |
|---|---|---|
| 2006/0275658 A1 | 12/2006 | Sanada et al. |
| 2011/0129718 A1 | 6/2011 | Lee |
| (Continued) | | |

FOREIGN PATENT DOCUMENTS

| | | |
|---|---|---|
| CN | 103222098 A | 7/2013 |
| CN | 104904053 A | 9/2015 |
| (Continued) | | |

OTHER PUBLICATIONS

Extended European Search Report including Written Opinion for EP19850080.3 dated Nov. 30, 2020; 7 pages.
(Continued)

*Primary Examiner* — Jonathan Crepeau
(74) *Attorney, Agent, or Firm* — Lerner, David, Littenberg, Krumholz & Mentlik, LLP

(57) ABSTRACT

The present invention provides a single electrode assembly, in which a plurality of negative electrodes and positive electrodes are stacked alternately and repeatedly, and separators are disposed between the plurality of negative electrodes and positive electrodes, the electrode assembly including: a negative electrode tab part formed on one end of the electrode assembly and extending from the plurality of negative electrodes; a positive electrode bus bar spaced apart from the negative electrode tab part on the one end of the electrode assembly and electrically connecting the plurality of the positive electrodes; a positive electrode tab part formed on the other end of the electrode assembly opposite to the one end and extending from the plurality of positive electrodes; and a negative electrode bus bar spaced apart from the positive electrode tab part on the other end of the electrode assembly and electrically connecting the plurality of the negative electrodes.

11 Claims, 7 Drawing Sheets

(51) Int. Cl.
*H01M 50/531* (2021.01)
*H01M 50/543* (2021.01)
*H01M 50/548* (2021.01)
*H01M 50/553* (2021.01)
*H01M 50/536* (2021.01)

(52) U.S. Cl.
CPC ....... *H01M 50/543* (2021.01); *H01M 50/548* (2021.01); *H01M 50/553* (2021.01); *H01M 50/536* (2021.01)

(56) References Cited

U.S. PATENT DOCUMENTS

| | | | |
|---|---|---|---|
| 2013/0130075 | A1 | 5/2013 | Kim et al. |
| 2014/0134461 | A1 | 5/2014 | Inoue et al. |
| 2015/0147629 | A1 | 5/2015 | Kim et al. |
| 2015/0303415 | A1 | 10/2015 | Kayano et al. |
| 2015/0380716 | A1 | 12/2015 | Zama et al. |
| 2017/0069929 | A1 | 3/2017 | Kim |
| 2017/0352858 | A1 | 12/2017 | Park et al. |
| 2020/0235436 | A1 | 7/2020 | Kim et al. |

FOREIGN PATENT DOCUMENTS

| | | | |
|---|---|---|---|
| CN | 105027347 | A | 11/2015 |
| EP | 2966721 | A1 | 1/2016 |
| EP | 3413391 | A1 | 12/2018 |
| JP | 2000058012 | A | 2/2000 |
| JP | 2001325945 | A | 11/2001 |
| JP | 2002175790 | A | 6/2002 |
| JP | 2012054197 | A | 3/2012 |
| JP | 2013069417 | A | 4/2013 |
| JP | 2013178997 | A | 9/2013 |
| JP | 2014135204 | A | 7/2014 |
| JP | 2016009685 | A | 1/2016 |
| JP | 6007907 | B2 | 10/2016 |
| JP | 2018092955 | A | 6/2018 |
| KR | 20060125607 | A | 12/2006 |
| KR | 20080038465 | A | 5/2008 |
| KR | 20110061281 | A | 6/2011 |
| KR | 20140044440 | A | 4/2014 |
| KR | 20140083344 | A | 7/2014 |
| KR | 20150060830 | A | 6/2015 |
| KR | 20170028789 | A | 3/2017 |
| KR | 101789066 | B1 | 10/2017 |
| KR | 20170138253 | A | 12/2017 |

OTHER PUBLICATIONS

International Search Report from Application No. PCT/KR2019/008590 dated Oct. 17, 2019, 2 pages.

Search Report dated Oct. 11, 2022 from the Office Action for Chinese Application No. 201980004544.6 dated Oct. 17, 2022, 3 pages. [See p. 1-2, categorizing the cited references].

ELECTRODE ASSEMBLY AND METHOD FOR MANUFACTURING THE SAME

CROSS-REFERENCE TO RELATED APPLICATION

The present application is a national phase entry under 35 U.S.C. § 371 of International Application No. PCT/KR2019/008590, filed on Jul. 11, 2019, published in Korean, which claims priority to Korean Patent Application No. 10-2018-0094484, filed on Aug. 13, 2018, the disclosures of which are hereby incorporated by reference herein in their entireties.

TECHNICAL FIELD

The present invention relates to an electrode assembly and a method for manufacturing the same and, more particularly, to an electrode assembly, in which a deviation in current density inside a cell is reduced, and a method for manufacturing the same.

BACKGROUND ART

Batteries (cells) that generate electric energy through physical or chemical reaction of materials to supply power to the outside are used when alternate current (AC) power to be supplied to the building is not obtained, or direct current (DC) power is required according to the living environments surrounded by various electrical/electronic devices.

Among such batteries, primary batteries and secondary batteries, which are chemical cells using chemical reaction, are being generally used. The primary batteries are consumable cells which are collectively referred to as dry cells. Also, the secondary batteries are rechargeable batteries manufactured by using a material in which oxidation and reduction processes between current and a material are capable of being repeated several times. That is, power is recharged when the reduction reaction to the material is performed by the current, power is discharged when the oxidation reaction to the material is performed. Such the recharging and discharging are repeatedly performed to generate electricity.

A lithium ion battery among the secondary batteries is manufactured in such a manner in which: an active material is applied, with a predetermined thickness, to each of a positive electrode conductive foil and a negative electrode conductive foil; a separator is disposed between both the conductive foils so as to be wound several times in an approximate jelly roll or cylindrical shape and thereby to manufacture an electrode assembly; and the electrode assembly is accommodated in a cylindrical or prismatic can, a pouch, or the like to be sealed.

As such a lithium ion battery has been commercialized and widely used, applications thereof also become diverse in vehicles/electronic devices/power tools.

Accordingly, an output of the secondary battery has also been regarded as an important specification.

Recently, in a polymer cell, a positive electrode/a separator/a negative electrode/a separator are stacked sequentially and connected to a tab part, thereby establishing connection between the positive electrodes and between the negative electrodes.

A battery cell having excellent structural safety and insulation resistance is disclosed in Korean Patent Publication No. 10-2008-0038465.

In the pouch type batteries according to the related art, one positive electrode terminal and one negative electrode terminal are being used in a single direction/bi-direction.

However, such a pouch battery according to the related art has a problem in which a size of a tab that is an inlet for electrons is small relative to a gradually increasing electrode area.

Thus, there has been a problem in which a passage through which current flows is small to cause a difference in current density inside an electrode, resulting in an occurrence of deviation in current density.

DISCLOSURE OF THE INVENTION

Technical Problem

Accordingly, the present invention has been made to solve the above problem, and an object of the present invention is to provide an electrode assembly capable of securing an electron transfer path inside the electrode assembly and a method for manufacturing the same.

Technical Solution

A single electrode assembly, in which a plurality of negative electrodes and positive electrodes are stacked alternately and repeatedly, and separators are disposed between the plurality of negative electrodes and positive electrodes, according to an embodiment of the present invention includes: a negative electrode tab part formed on one end of the electrode assembly and extending from the plurality of negative electrodes; a positive electrode bus bar spaced apart from the negative electrode tab part on the one end of the electrode assembly and electrically connecting the plurality of the positive electrodes; a positive electrode tab part formed on the other end of the electrode assembly opposite to the one end and extending from the plurality of positive electrodes; and a negative electrode bus bar spaced apart from the positive electrode tab part on the other end of the electrode assembly and electrically connecting the plurality of the negative electrodes.

The positive electrode bus bar and the negative electrode bus bar may be formed in symmetrical positions about a central portion of the electrode assembly.

Each of the positive electrode bus bar and the negative electrode bus bar may be formed in plurality.

The positive electrode bus bar may be formed as an electrode collector extending from the positive electrodes, and the negative electrode bus bar may be formed as an electrode collector extending from the negative electrodes.

The single electrode assembly may include an insulating member installed either between the positive electrode bus bar and the negative electrodes of the electrode assembly so as to insulate the positive electrode bus bar from the negative electrodes or between the negative electrode bus bar and the positive electrodes of the electrode assembly so as to insulate the negative electrode bus bar from the positive electrodes.

A method for manufacturing an electrode stack according to an embodiment of the present invention includes: a stacking step of alternately stacking electrodes and separators to form an electrode stack, wherein the electrode stack is formed by using negative electrodes including negative electrode extension parts that are portions longer than positive electrodes and separators on one end of the electrode stack and the positive electrodes including positive electrode extension parts that are portions longer than the negative electrodes and the separators on the other end of the electrode stack; a negative electrode welding step of welding the plurality of negative electrode extension parts included in the plurality of negative electrodes; and a positive electrode welding step of welding the plurality of positive electrode extension parts included in the plurality of positive electrodes.

In the stacking step, the positive electrodes in which a positive electrode tab part is formed on the one end, the separators, and the negative electrodes including the negative electrode extension parts on the one end may be stacked sequentially.

When the negative electrode extension parts are welded to each other in the negative electrode welding step, portions spaced apart from the positive electrode tab part in the negative electrode extension parts may be welded.

In the stacking step, the negative electrodes in which a negative electrode tab part is formed on the other end, the separators, and the positive electrodes including the positive electrode extension parts on the other end may be stacked sequentially.

When the positive electrode extension parts are welded to each other in the positive electrode welding step, portions spaced apart from the negative electrode tab part in the positive electrode extension parts may be welded.

In the negative electrode welding step and the positive electrode welding step, each of the negative electrode extension parts and the positive electrode extension parts may be welded through ultrasonic welding or thermal welding.

The method may further include a negative electrode cutting step of cutting portions that are not welded to each other in the negative electrode extension parts.

The negative electrode extension parts that are not cut but welded to each other in the negative electrode cutting step may provide a negative electrode bus bar.

The method may further include a first insulating member installation step of installing an insulating member to insulate the negative electrode bus bar from the positive electrodes of the electrode stack.

The method may further include a positive electrode cutting step of cutting portions that are not welded to each other in the positive electrode extension parts.

The positive electrode extension parts that are not cut but welded to each other in the positive electrode cutting step may provide a positive electrode bus bar.

The method may further include a second insulating member installation step of installing an insulating member to insulate the positive electrode bus bar from the negative electrodes of the electrode stack.

A secondary battery according to an embodiment of the present invention includes a single electrode assembly in which a plurality of negative electrodes and positive electrodes are stacked alternately and repeatedly and separators are disposed between the plurality of negative electrodes and positive electrodes, the secondary battery including: a negative electrode tab part formed on one end of the electrode assembly and extending from the plurality of negative electrodes; a positive electrode bus bar spaced apart from the negative electrode tab part on the one end of the electrode assembly and electrically connecting the plurality of the positive electrodes; a positive electrode tab part formed on the other end of the electrode assembly opposite to the one end and extending from the plurality of positive electrodes; and a negative electrode bus bar spaced apart from the positive electrode tab part on the other end of the electrode assembly and electrically connecting the plurality of the negative electrodes.

Advantageous Effects

According to the present invention, there is an effect of minimizing the deviation in current density by securing the electron transfer path inside the electrode assembly.

According to the present invention, there is an effect of enhancing the output by securing the electron transfer path inside the electrode assembly.

MODE FOR CARRYING OUT THE INVENTION

Figure 1:
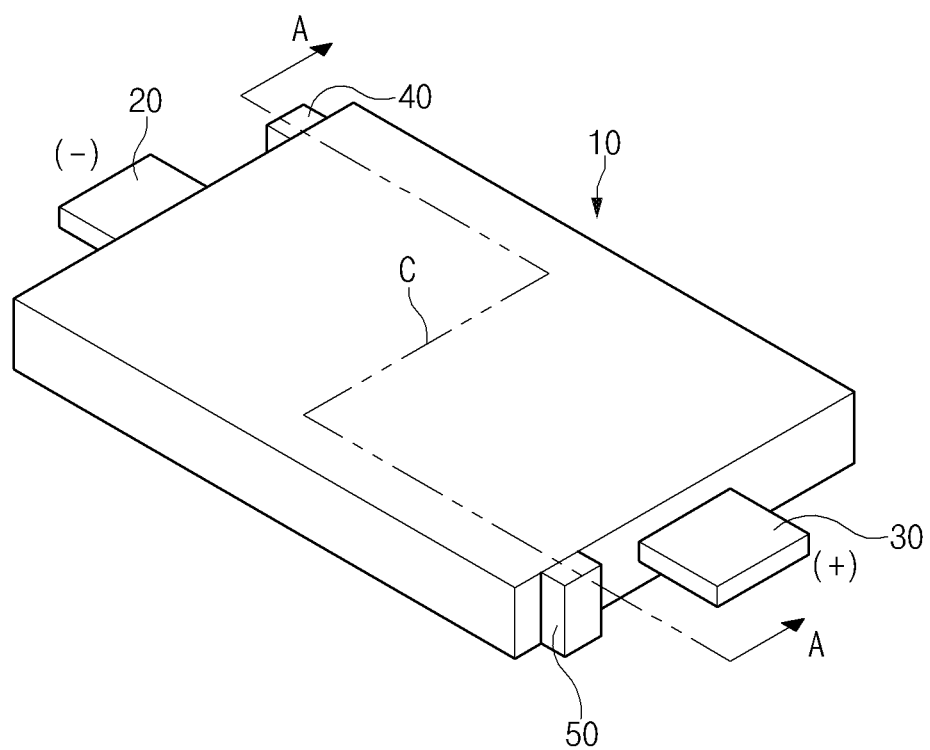
FIG. 1 is a perspective view illustrating an electrode assembly according to an embodiment of the present invention.

Hereinafter, an electrode assembly and a method for manufacturing the electrode assembly according to preferred embodiments of the present invention will be described in detail with reference to the accompanying drawings.

Terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways. Therefore, the embodiments described in this specification and the configurations illustrated in the drawings are only preferred embodiments of the present invention, and may not describe the technical spirit thoroughly. Accordingly, it should be understood that various equivalents and modifications that can be substituted for the embodiments might be provided at the filing date of the present application.

In the drawings, the dimension of each of components or a specific portion constituting the component is exaggerated, omitted, or schematically illustrated for convenience in description and clarity. Thus, the dimension of each element does not entirely reflect an actual size. Moreover, detailed descriptions related to well-known functions or configurations will be ruled out in order not to unnecessarily obscure subject matters of the present invention.

Figure 2:
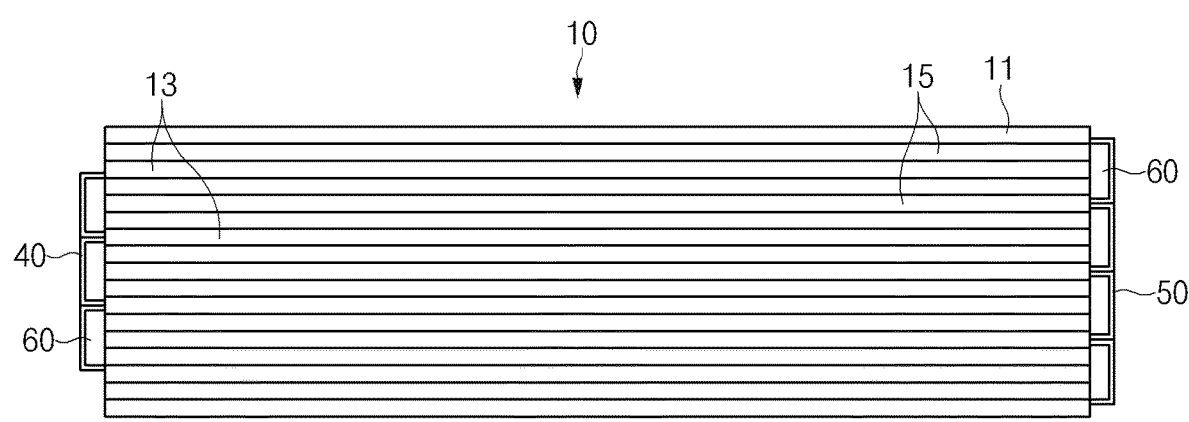
FIG. 2 is a side cross-sectional view illustrating main parts of the electrode assembly, taken along line A-A of FIG. 1.

FIG. 1 is a perspective view illustrating an electrode assembly according to an embodiment of the present invention, and FIG. 2 is a side cross-sectional view illustrating main parts of the electrode assembly, taken along line A-A of FIG. 1.

Referring to FIGS. 1 and 2, a single electrode assembly 10, in which a plurality of negative electrodes 11 and positive electrodes 13 are stacked alternately and repeatedly, and separators 15 are disposed between the plurality of negative electrodes 11 and positive electrodes 13, according to an embodiment of the present invention includes: a negative electrode tab part 20 formed on one end of the electrode assembly 10 and extending from the plurality of negative electrodes 11; a positive electrode bus bar 40 spaced apart from the negative electrode tab part 20 on the one end of the electrode assembly 10 and electrically connecting the plurality of the positive electrodes 13; a positive electrode tab part 30 formed on the other end of the electrode assembly 10 opposite to the one end and extending from the plurality of positive electrodes 13; and a negative electrode bus bar 50 spaced apart from the positive electrode tab part 30 on the other end of the electrode assembly 10 and electrically connecting the plurality of the negative electrodes 11.

The positive electrodes 13 may be an aluminum electrode collector and include a positive electrode coating portion coated with a positive electrode active material and a positive electrode non-coating portion that is not coated with the positive electrode active material.

The positive electrode active material may be lithium-containing transition metal oxide or a lithium chalcogenide compound such as $LiCoO_2$, $LiNiO_2$, $LiMnO_2$, and $LiMnO_4$.

The positive electrode coating portion is formed, for example, by applying the positive electrode active material onto a portion of at least one surface of the aluminum electrode collector, and other portions of the aluminum electrode collector, in which the positive electrode active material is not applied, may serve as the positive electrode non-coating portion.

The positive electrode tab part 30 may be electrically connected to the positive electrode non-coating portion to extend from the positive electrodes 13.

The negative electrodes 11 may be a copper electrode collector and include a negative electrode coating portion coated with a negative electrode active material and a negative electrode non-coating portion that is not coated with the negative electrode active material.

The negative electrode active material may be a carbon material such as crystalline carbon, amorphous carbon, carbon composite, and carbon fiber, lithium metal, a lithium alloy, or the like.

The negative electrode coating portion is formed, for example, by applying the negative electrode active material onto a portion of at least one surface of the copper electrode collector, and other portions of the copper electrode collector, in which the negative electrode active material is not applied, may serve as the negative electrode non-coating portion.

The negative electrode tab part 20 is electrically connected to the negative electrode non-coating portion to extend from the negative electrodes 13.

The separators may be manufactured, for example, by applying a polyvinylidene fluoride-hexafluoropropylene co-polymer (PVDF-HFP co-polymer) onto a base material selected from the group consisting of polyethylene (PE), polystyrene (PS), polypropylene (PP), and a co-polymer of polyethylene (PE) and polypropylene (PP).

The positive electrode bus bar 40 may be formed as an electrode collector extending from the positive electrodes 13 of the electrode assembly 10 so as to be spaced apart from the negative electrode tab part 20 on an end of the electrode assembly 10 in which the negative electrode tab part 20 is formed. This positive electrode bus bar 40 may electrically connect the plurality of positive electrodes 13 to enable current to flow, while spaced apart from the negative electrode tab part 20 to prevent short-circuit with the negative electrode tab part 20.

The positive electrode bus bar 40 may be made of an aluminum material.

The negative electrode bus bar 50 may be formed as an electrode collector extending from the negative electrodes 11 of the electrode assembly 10 so as to be spaced apart from the positive electrode tab part 30 on an end of the electrode assembly 10 in which the positive electrode tab part 30 is formed. This negative electrode bus bar 50 may electrically connect the plurality of negative electrodes 11 to enable current to flow, while spaced apart from the positive electrode tab part 30 to prevent short-circuit with the positive electrode tab part 30.

The negative electrode bus bar 40 may be made of a copper material.

In a medium- or large-sized secondary battery, heat may be accumulated to increase in temperature inside the battery due to an increasing thickness, and the accumulated heat may cause an increase in the temperature of the secondary battery.

The positive electrode bus bar 40 and the negative electrode bus bar 50 may be formed in diagonally symmetrical positions about a central portion C of the electrode assembly 10. That is, heat dissipation due to the flow of current may be distributed over the entirety of the electrode assembly 10 by maximizing a spaced distance between the positive electrode bus bar 40 and the negative electrode bus bar 50, and thus there may be an effect of preventing an increase in the temperature of the secondary battery and improving safety.

Each of the positive electrode bus bar 40 and the negative electrode bus bar 50 is formed in plurality to secure an electron transfer path uniformly over the entirety of the single electrode assembly, and thus there may be effects of preventing a deviation in current density, improving safety through heat distribution, and enhancing an output.

Referring to FIG. 2, according to another embodiment of the present invention, an insulating member 60 such as rubber or plastic may be installed between the positive electrode bus bar 40 and the negative electrodes 11 of the electrode assembly 10.

The insulating member 60 may be installed between the positive electrode bus bar 40 and the negative electrodes 11 of the electrode assembly 10 so as to insulate the positive electrode bus bar 40 from the negative electrodes 11, thereby preventing short-circuit between the positive electrode bus bar 40 and the negative electrodes 11.

Also, the insulating member 60 may be installed between the negative electrode bus bar 50 and the positive electrodes 13 of the electrode assembly 10 so as to insulate the negative electrode bus bar 50 from the positive electrodes 13, thereby preventing short-circuit between the negative electrode bus bar 50 and the positive electrodes.

Hereinafter, a method for manufacturing an electrode assembly according to an embodiment of the present invention will be described with reference to the drawings.

Figure 3:
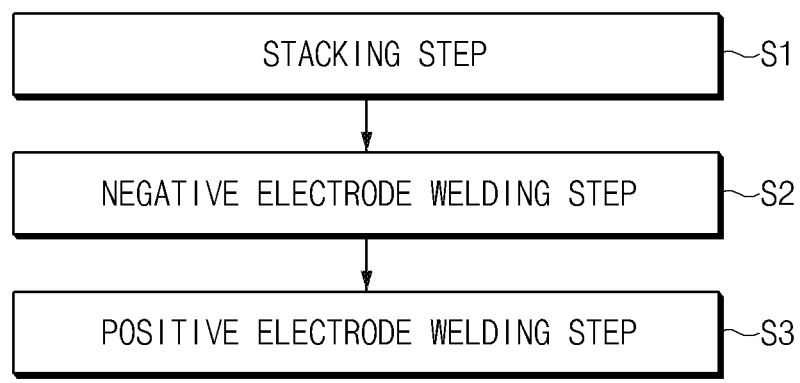
FIG. 3 is a flowchart sequentially illustrating a method for manufacturing an electrode assembly according to an embodiment of the present invention.

FIG. 3 is a flowchart sequentially illustrating a method for manufacturing an electrode assembly according to an embodiment of the present invention.

As illustrated in FIG. 3, the method for manufacturing the electrode assembly according to the embodiment of the present invention may include a stacking step (S1), a negative electrode welding step (S2), and a positive electrode welding step (S3).

Figure 4:
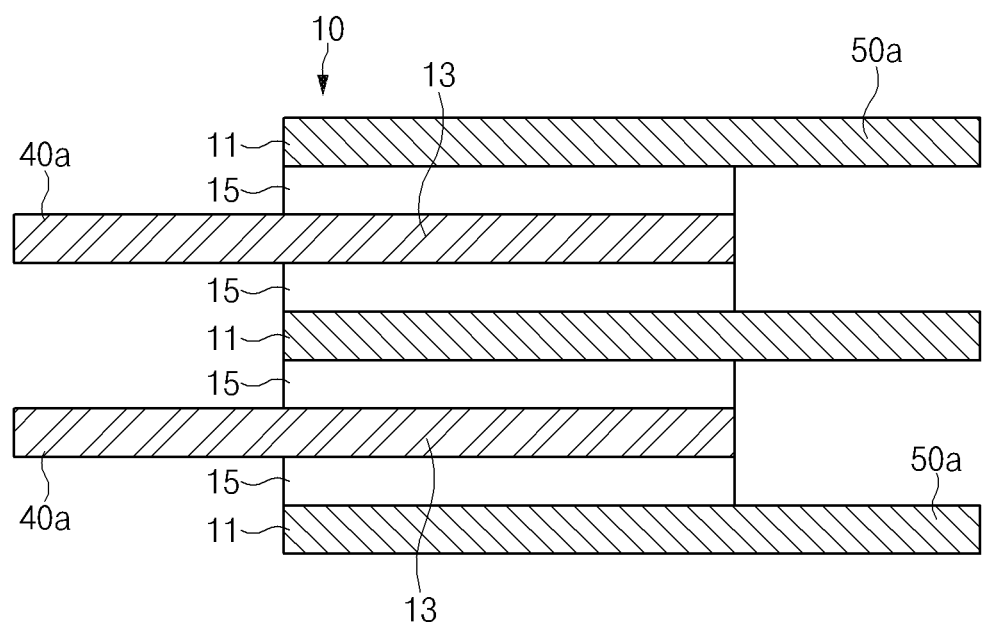
FIG. 4 is a schematic side view illustrating a stacking step in the method for manufacturing the electrode assembly according to the embodiment of the present invention.

FIG. 4 is a schematic side view illustrating a stacking step in the method for manufacturing the electrode assembly according to the embodiment of the present invention.

As illustrated in FIG. 4, electrodes and separators may be alternately stacked to form a single electrode stack in the stacking step (S1). Here, negative electrodes 11 may include negative electrode extension parts 50a that are portions longer than positive electrodes 13 and separators 15 on one end. Also, the positive electrodes 13 may include positive electrode extension parts 40a that are portions longer than the negative electrodes 11 and the separators 15.

Also, in the stacking step (S1), the positive electrodes 13 in which a positive electrode tab part 30 is formed on the one end, the separators 15, and the negative electrodes 11 including the negative electrode extension parts 50a on the one end may be stacked sequentially.

In addition, in the stacking step (S1), the negative electrodes 11 in which a negative electrode tab part 20 is formed on the other end, the separators 15, and the positive electrodes 13 including the positive electrode extension parts 40a on the other end may be stacked sequentially.

Consequently, the stacking step may mean to sequentially stack the positive electrodes 13 in which the positive electrode tab part 30 is formed on the one end and which include the positive electrode extension parts 40a on the other end/the separators 15/the negative electrodes 11 which include the negative electrode extension parts 50a on the one end and in which the negative electrode tab part 20 is formed on the other end.

Figure 5:
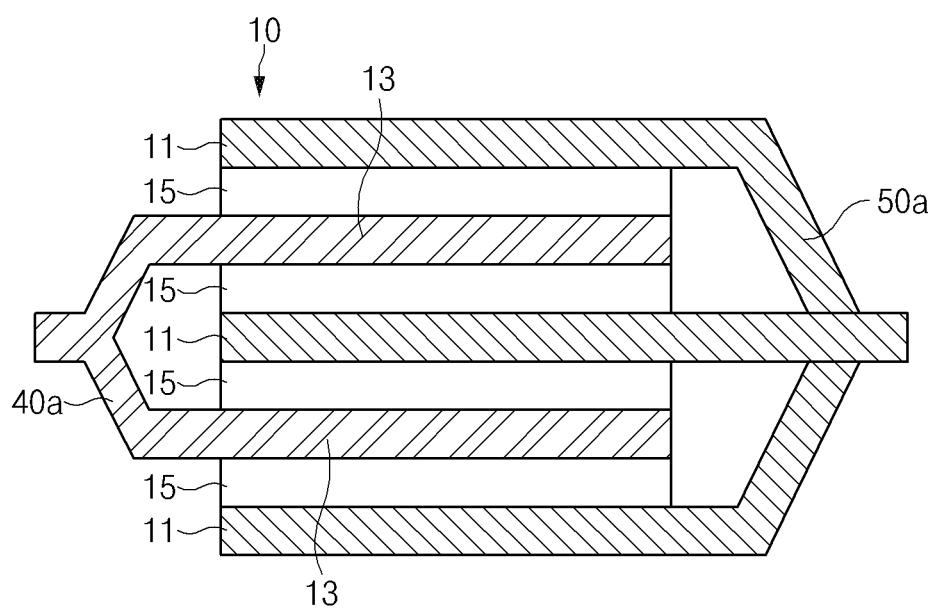
FIG. 5 is a schematic side view illustrating a welding step of a negative electrode and a positive electrode in the method for manufacturing the electrode assembly according to the embodiment of the present invention.

FIG. 5 is a schematic side view illustrating a welding step of a negative electrode and a positive electrode in the method for manufacturing the electrode assembly according to the embodiment of the present invention.

As illustrated in FIG. 5, the plurality of negative electrode extension parts 50a included in the plurality of negative electrodes 11 may be welded to each other in the negative electrode welding step (S2). Here, when the negative electrode extension parts 50a are welded to each other, portions spaced apart from the positive electrode tab part 30 in the negative electrode extension parts 50a may be welded.

The positive electrode extension parts 40a included in the plurality of positive electrodes 13 may be welded to each other in the positive electrode welding step (S3). Here, when the positive electrode extension parts 40a are welded to each other, portions spaced apart from the negative electrode tab part 20 in the positive electrode extension parts 40a may be welded.

As described above, the portions spaced apart from the positive electrode tab part 30 in the negative electrode extension parts 50a are welded, the portions spaced apart from the negative electrode tab part 20 in the positive electrode extension parts 40a are welded, and then portions that are not welded are cut in a negative electrode cutting step and a positive electrode cutting step that will be described later. As a result, a risk of the short-circuit may be prevented. That is, the welded portions of each of the negative electrode extension parts 50a and the positive electrode extension parts 40a, remaining after being cut in the negative electrode cutting step and the positive electrode cutting step, are spaced apart from and do not contact each other of the positive electrode tab part 30 and the negative electrode tab part 20, and thus the risk of short-circuit may be eliminated.

The welding for each of the negative electrode extension parts 50a and the positive electrode extension parts 40a in the negative electrode welding step (S2) and the positive electrode welding step (S3) may be performed through ultrasonic welding or thermal welding.

Figure 6:
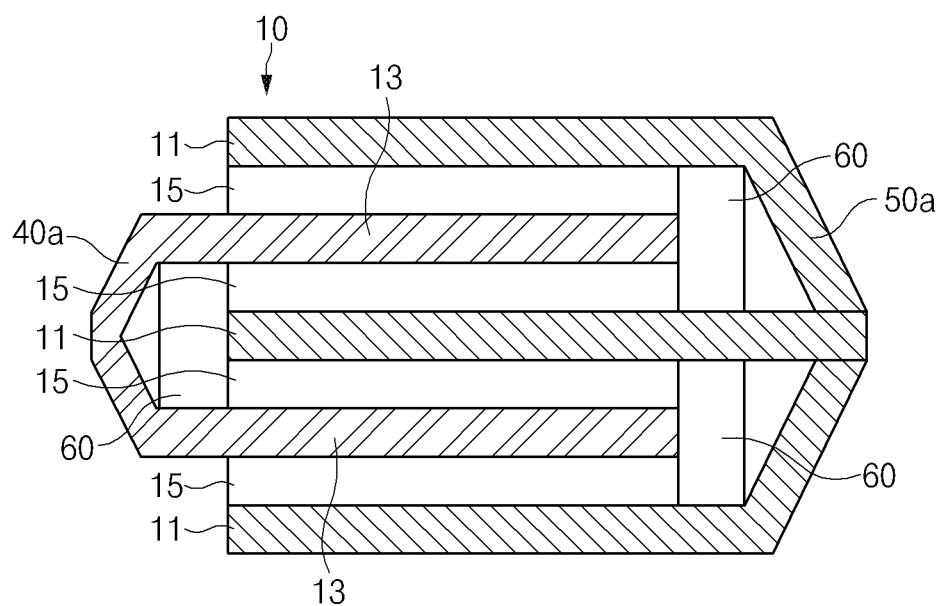
FIG. 6 is a schematic side view illustrating a cutting step in a method for manufacturing an electrode assembly according to another embodiment of the present invention.

FIG. 6 is a schematic side view illustrating a cutting step in a method for manufacturing an electrode assembly according to another embodiment of the present invention.

As illustrated in FIG. 6, a method for manufacturing an electrode assembly according to another embodiment of the present invention may further include a negative electrode cutting step of cutting portions that are not welded in the negative electrode extension parts 50a. Also, the method may further include a positive electrode cutting step of cutting portions that are not welded in the positive electrode extension parts 40a. By cutting the portions that are not welded in the negative electrode extension parts 50a and the positive electrode extension parts 40a, possibilities of both short-circuit between the negative electrode extension parts 50a and the positive electrode tab part 30 and short-circuit between the positive electrode extension parts 40a and the negative electrode tab part 20 may be eliminated.

The portions that are not welded and cut out may be ends of the electrode extension parts 40a and 50a in a direction parallel to the electrode tab parts 20 and 30 or may be ends of the electrode extension parts 40a and 50a in a direction toward the electrode tab parts 20 and 30.

The positive electrode extension parts 40a that are not cut in the positive electrode cutting step but welded to each other may provide a positive electrode bus bar 40. Also, the negative electrode extension parts 50a that are not cut in the negative electrode cutting step but welded to each other may provide a negative electrode bus bar 50.

In addition, referring to FIG. 6, the method may further include a first insulating member installation step of installing an insulating member 60 between the negative electrode bus bar 50 and the positive electrodes 13 of the electrode stack to prevent short-circuit.

Furthermore, the method may further include a second insulating member installation step of installing an insulating member 60 between the positive electrode bus bar 40 and the negative electrodes 11 of the electrode stack to prevent short-circuit.

Figure 7:
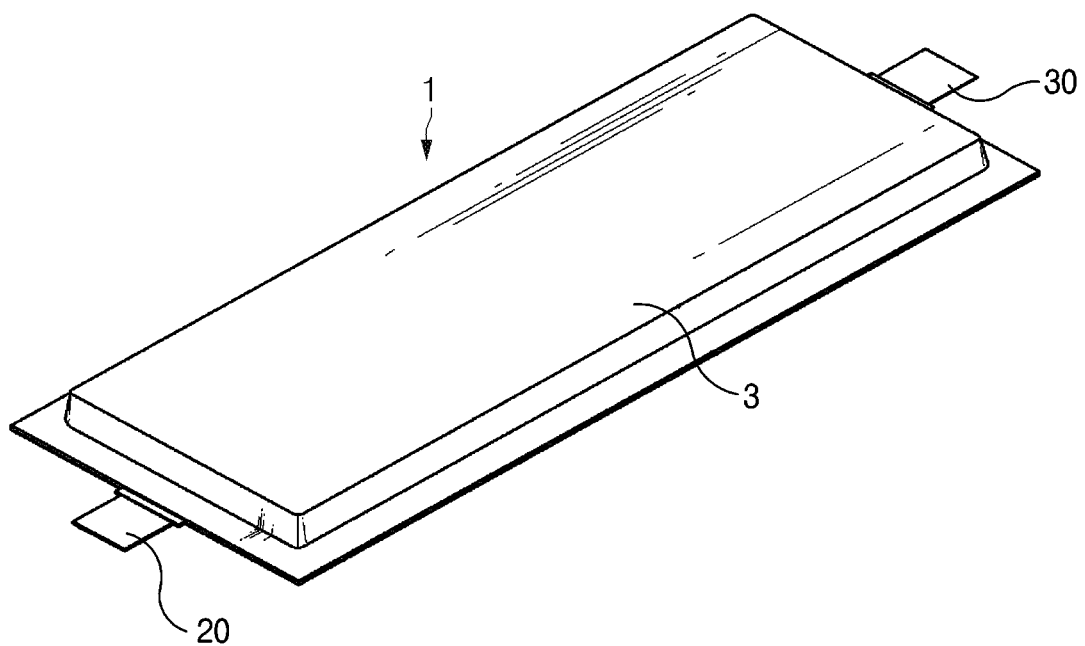
FIG. 7 is a perspective view illustrating a secondary battery according to an embodiment of the present invention.

FIG. 7 is a perspective view illustrating a secondary battery according to an embodiment of the present invention.

Referring to FIGS. 1, 2, and 7, a secondary battery including a single electrode assembly 10, in which a plurality of negative electrodes 11 and positive electrodes 13 are stacked alternately and repeatedly, and separators 15 are disposed between the plurality of negative electrodes 11 and positive electrodes 13, according to an embodiment of the present invention includes: a negative electrode tab part 20 formed on one end of the electrode assembly 10 and extending from the plurality of negative electrodes 11; a positive electrode bus bar 40 spaced apart from the negative electrode tab part 20 on the one end of the electrode assembly 10 and electrically connecting the plurality of the positive electrodes 13; a positive electrode tab part 30 formed on the other end of the electrode assembly 10 opposite to the one end and extending from the plurality of positive electrodes 13; and a negative electrode bus bar 50 spaced apart from the positive electrode tab part 30 on the other end of the electrode assembly 10 and electrically connecting the plurality of the negative electrodes 11.

The electrode assembly 10 may be accommodated, together with an electrolyte, in a case 3 such as a can member or a pouch.

According to the present invention as described above, there is the effect of minimizing the deviation in current density by securing the electron transfer path inside the electrode assembly.

According to the present invention, there is the effect of enhancing the output by securing the electron transfer path inside the electrode assembly.

Although the electrode assembly and the method for manufacturing the electrode assembly have been described with reference to the exemplary drawings as described above, the present invention is not limited to the embodiments and drawings described and illustrated above, and various embodiments may be made within the scope of the appended claims by those skilled in the art pertaining to the present invention.

The invention claimed is:

1. A single electrode assembly, in which a plurality of negative electrodes and a plurality of positive electrodes are stacked alternately and repeatedly, and separators are disposed between the negative electrodes and the positive electrodes, the single electrode assembly comprising:
    a negative electrode tab part formed on one end of the electrode assembly and extending from the plurality of negative electrodes;
    a positive electrode bus bar spaced apart from the negative electrode tab part on the one end of the electrode assembly and electrically connecting the plurality of the positive electrodes;
    a positive electrode tab part formed on another end of the electrode assembly opposite to the one end and extending from the plurality of positive electrodes; and
    a negative electrode bus bar spaced apart from the positive electrode tab part on the another end of the electrode assembly and electrically connecting the plurality of the negative electrodes,
    wherein the positive electrode tab part and the negative electrode tab part each extend along a centerline of the single electrode assembly, and
    wherein the positive electrode bus bar and the negative electrode bus bar are disposed in diagonally symmetrical positions opposite from each other about a central portion of the electrode assembly.

2. The single electrode assembly of claim 1, wherein each of the positive electrode bus bar and the negative electrode bus bar is formed in plurality.

3. The single electrode assembly of claim 1, wherein the positive electrode bus bar is an electrode collector extending from the positive electrodes, and the negative electrode bus bar is an electrode collector extending from the negative electrodes.

4. The single electrode assembly of claim 1, further comprising an insulating member installed either between the positive electrode bus bar and the negative electrodes of the electrode assembly so as to insulate the positive electrode bus bar from the negative electrodes or between the negative electrode bus bar and the positive electrodes of the electrode assembly so as to insulate the negative electrode bus bar from the positive electrodes.

5. A method for manufacturing an electrode stack, the method comprising:
    a stacking step of alternately stacking negative electrodes, positive electrodes, and separators to form an electrode stack, the negative electrodes comprising negative electrode extension parts that are portions that extend beyond first peripheral edges of the positive electrodes and the separators on one end of the electrode stack, the positive electrodes comprising positive electrode extension parts that are portions that extend beyond second peripheral edges of the negative electrodes and the separators on another end of the electrode stack opposite to the one end, the positive electrodes being electrically connected to a positive electrode tab part formed on the one end, the negative electrodes being electrically connected to a negative electrode tab part formed on the another end, the positive electrode tab part and the negative electrode tab part each extending along a centerline of the electrode stack;
    a negative electrode welding step of welding the plurality of negative electrode extension parts to each other to form a negative electrode bus bar that is spaced apart from the positive electrode tab part; and
    a positive electrode welding step of welding the plurality of positive electrode extension parts to each other to form a positive electrode bus bar that is spaced apart from the negative electrode tab part,
    wherein the positive electrode bus bar and the negative electrode bus bar are disposed in diagonally symmetrical positions opposite from each other about a central portion of the electrode stack.

6. The method of claim 5, wherein in the negative electrode welding step and the positive electrode welding step, each of the negative electrode extension parts and the positive electrode extension parts are welded through ultrasonic welding or thermal welding.

7. The method of claim 5, further comprising a negative electrode cutting step of cutting portions of the negative electrode extension parts that are not welded to each other.

8. The method of claim 5, further comprising an insulating member installation step of installing an insulating member that insulates the negative electrode bus bar from the positive electrodes of the electrode stack.

9. The method of claim 5, further comprising a positive electrode cutting step of cutting portions of the positive electrode extension parts that are not welded to each other.

10. The method of claim 5, further comprising an insulating member installation step of installing an insulating member that insulates the positive electrode bus bar from the negative electrodes of the electrode stack.

11. A secondary battery comprising a single electrode assembly in which a plurality of negative electrodes and a plurality of positive electrodes are stacked alternately and repeatedly and separators are disposed between the negative electrodes and the positive electrodes, the secondary battery comprising:
    a negative electrode tab part formed on one end of the electrode assembly and extending from the plurality of negative electrodes;
    a positive electrode bus bar spaced apart from the negative electrode tab part on the one end of the electrode assembly and electrically connecting the plurality of the positive electrodes;
    a positive electrode tab part formed on another end of the electrode assembly opposite to the one end and extending from the plurality of positive electrodes; and
    a negative electrode bus bar spaced apart from the positive electrode tab part on the another end of the electrode assembly and electrically connecting the plurality of the negative electrodes, wherein the positive electrode tab part and the negative electrode tab part each extend along a centerline of the single electrode assembly, and wherein the positive electrode bus bar and the negative electrode bus bar are disposed in diagonally symmetrical positions opposite from each other about a central portion of the electrode assembly.

\* \* \* \* \*